8221X
J. ROOT.
CONDENSER.
Patented May 26, 1834.
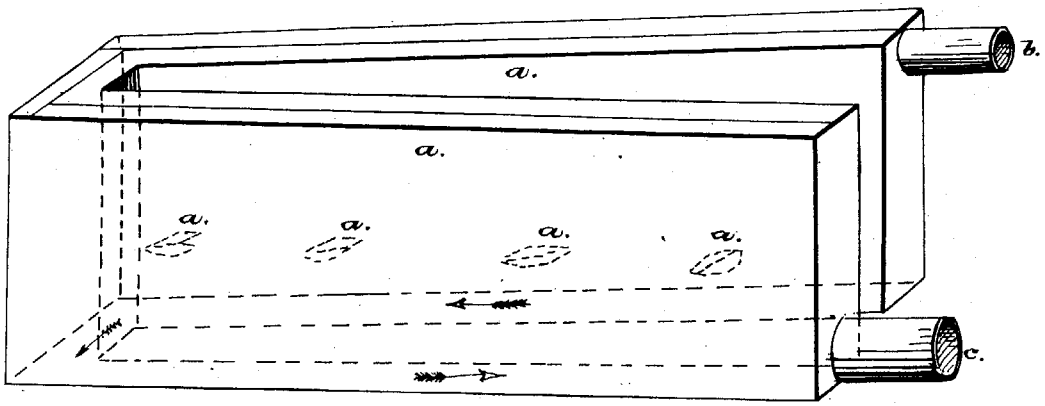
THE NORRIS PETERS CO., PHOTO-LITHO., WASHINGTON, D. C.

8221x                                        May 26, 1834

May 26. 1834                                        1.

James Root Painesville Ohio
Letters Patent

The Schedule referred to in these Letters Patent and making part of the same containing a description in the words of the said James Root himself of his improvement called "Roots Condenser"

To all to whom these presents shall come.. I James Root late of Albany in the State of New York now of the Town of Painesville, County of Geauga and State of Ohio send Greeting. Be it Known that I the said James Root have invented constructed and applied to use a new and useful improvement in the form and construction of a worm or condenser for the purpose of ~~condensing~~ ~~for the purpose~~ of condensing vapour or Steam arising from the boiling of any fermented or other liquids for distillation and separating the water from the Spirit by which Spirit is obtained much purer and at less expense than by any other means.. called "Roots improved condenser" Specified in the words following Viz. This improvement consists in the form of the worm which is flat instead of being round, and in its dimensions and manner of construction, which is as follows.

Form two plates from sheet copper, each fifty two feet in length, and fifteen and a half inches in width; upon one of these sheets intended for the inner side of the condenser, turn down each edge three fourths of an inch the whole length of the sheet at right angles with it, form twenty six studs or braces of sheet copper two inches square, and one inch in length and solder them firmly by one end along the centre of the sheet at the distance of six inches from each other, the sheet is then bent at right angles four inches each way from the longitudinal centre, and the two ends brought ar[illegible]nd within eight inches of each other. the bend is slightly twisted so that when the sheet is placed on one edge there may be an ascent of one half [illegible] inch to the foot from a horizontal line, which when the ends are brought around will raise or elevate one edge above the other twenty six inches. Then take the other sheet and turn the edges and bend it in the centre so that it will fit the first sheet and leave the space of one inch, the length of said braces between them and firmly solder the two sheets

8221X

May 26, 1834 together when the edges that have been turned over at right angles lap: forming a flat tube or worm, fifty two feet in length fourteen inches in depth and one inch in width turned at right angles four inches each way from the centre and the ends brought around even and eight inches apart, with the edge of one end elevated above that of the other twenty six inches, having a clear uniform space from the ends up to the angle of eight inches; into the lower edge of the lowest insert a cylindrical pipe or tube formed of sheet copper four inches in diameter and of any length necessary to connect the condenser with the boiler. One end of this pipe is elongated or flattened, so that it will properly fit into the condenser and there firmly soldered in and the residue of the end of the condenser fastened perfectly tight by a strip of copper soldered firmly on. Into the upper edge of the other end of the condenser insert and securely fasten by solder a pipe or tube of sheet copper two inches in diameter, elongated or flattened at the end passing into the condenser, and of any length required to connect the other end with a common still worm, the remainder of the end of the condenser is then to be securely closed in the same manner as the other — making the condenser perfectly tight excluding both air and water except through the two tubes or pipes in the ends as aforesaid; a more perfect idea may be obtained from an examination of the accompanying drawing of said condenser to which reference is had for that purpose a a The body of the condenser, completed and placed on one edge, at an elevation of one half inch to the foot from a horizontal line. C pipe four inches in diameter through which the steam arising from the boiling beer, fermented liquor or other liquid or substance to be distilled, passes from the boiler into the condenser. B pipe two inches in diameter through which the spirit, vapour or steam when separated from the aqueous, and heavy parts in the flat condenser passes and is received into a common still worm, to be condensed.

d, d, d, d, Braces or studs placed six inches apart in the centre of the condenser to prevent its collapsing from the pressure of the water surrounding it. The arrows show the course of the condensed water returning along the bottom of the condenser, and into the boiler through the pipe C. which is made large for that purpose, so that the returning water and entering steam may not interfere. This condenser is calculated for a boiler that will contain three hundred gallons.

8221x May 26, 1834 and should be increased in length and depth in proportion as the boiler shall be either larger or smaller, and the diameter of the pipe or tube c. should also be increased in proportion to the enlarged size of the boiler Application and use. The condenser when applied to use is placed in a vat or trough twenty seven feet long, three and a half feet deep and eighteen inches wide on its edge, having the pipe c. at the bottom and elevated one half inch to the foot from a horizontal line at the angle or turn in the condenser and the pipe c. firmly and tightly connected with the boiler forming a conductor from the boiler to the condenser, and the pipe b attached to and forming a conductor from the condenser to the common still worm. The vat is then filled with cold water and the boiler charged with beer or other liquid or substance, to be distilled and the heat applied as in common distilleries. The steam passing from the boiler into the condenser will all condense and return back into the boiler, until the water in the vat is raised to about one hundred and seventy six degrees of Farenheits Thermometer. when the watery and heavy parts of the steam in the condenser will condense and seperate from the spirituous or lighter parts and fall to the bottom of the condensor and return into the boiler through the pipe c. while the spirituous parts of the steam will rise and ascend along the upper edge of the condenser and pass out through the pipe b into a common still worm to be condensed when the water in the vat arises to the proper degree of heat and the spirit arises and passes through the pipe b. it should be kept at that temperature by running a stream of cold water into it sufficient to counteract the effect of the continual heat thrown out by the steam passing through the condenser. By increasing the temperature of the water in the vat above 176 degrees you diminish the strength of the spirit, it being the purest at the lowest temperature of the water in the vat at which the spirit and water will separate in the conden[illegible]. The condenser is designed more especially for the manufacture of alcohol or high spirits which can be obtained by passing it once through the still, from eighty six to ninety four per cent above hydrometer proof whiskey. and by going through the process termed doubling that is running it through the still again, it will come over as high as ninety five per cent above proof. Advantages. The advantages of my improved worm or condenser over any other known or used prior to my 8221x                                   May 26, 1834 said invention, are principally these. It is extremely difficult by any other worm, or condenser, to manufacture alcohol even as high as eighty degrees above hydrometer proof, and almost impossible to run it as high as ninety per cent above proof or high enough for the making of what is called alcoholic gas whereas by means of my improved condenser alcohol can be obtained as high as ninety six per cent above hydrometer proof, and the expense is but a trifle more than the expense of running common proof whiskey and for the purpose of manufacturing gas from alcohol and spirits of turpentine, the improvement in making and obtaining the alcohol is invaluable on account of its purity and the low price per gallon at which it can be made.

My improvement and for which I claim a patent consists in the constructing of the worm or condenser flat so that the sheet of steam passing through it shall not be more than one inch thick, and of sufficient depth to allow the ascending steam of spirit and the descending condensed water to pass along the condenser without interfering, and in putting in the studs to prevent the collapsing of the condenser. The condenser may be made of any length, and it is believed that if made long enough it will separate the water and spirit entirely, but for any known use it may be obtained pure enough by one of the length heretofore mentioned. It may also be made straight, circular, zig zag, octagon or quadrate, as may best suit the convenience of the works, and the fancy of the maker, the principle is the same and care should be taken that the width or thickness in no case exceeds one inch. the principle of the separation of water from spirit by means of surrounding the condenser with hot water, I do not claim as any part of my improvement or invention. My invention being more properly an improvement on the patent of James L Jencks, for an improvement in the process of distilling. In testimony that the above is a true specification of my said invention and improvement as above described I hereto set my hand the twenty sixth day of April A D. Eighteen hundred and thirty four Witnesses
S. T. Osborn
T. Roza James Port Recd. MG Drawing (1792 words)

(Granted May 26. 1834)